United States Patent
Matsuoka et al.

(10) Patent No.: US 11,358,643 B2
(45) Date of Patent: Jun. 14, 2022

(54) COMPOSITE STRUCTURE

(71) Applicant: TORAY INDUSTRIES, INC., Tokyo (JP)

(72) Inventors: Hideo Matsuoka, Nagoya (JP); Kosaku Hashimoto, Nagoya (JP); Yukitane Kimoto, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 81 days.

(21) Appl. No.: 16/965,129

(22) PCT Filed: Mar. 1, 2019

(86) PCT No.: PCT/JP2019/008048
§ 371 (c)(1),
(2) Date: Jul. 27, 2020

(87) PCT Pub. No.: WO2019/181434
PCT Pub. Date: Sep. 26, 2019

(65) Prior Publication Data
US 2021/0039717 A1    Feb. 11, 2021

(30) Foreign Application Priority Data

Mar. 22, 2018    (JP) .............................. JP2018-054342

(51) Int. Cl.
*B62D 21/15*    (2006.01)
*B62D 29/00*    (2006.01)
(Continued)

(52) U.S. Cl.
CPC ........... *B62D 21/15* (2013.01); *B62D 29/001* (2013.01); *B60R 19/18* (2013.01);
(Continued)

(58) Field of Classification Search
CPC .... B62D 21/15; B62D 29/001; B62D 29/004; B62D 29/008; B60R 2019/1833;
(Continued)

(56) References Cited

U.S. PATENT DOCUMENTS 4,978,562 A * 12/1990 Wycech ................. B60J 5/0444
                                                     264/46.6
8,047,603 B2 * 11/2011 Goral .................... B62D 29/005
                                                    296/187.03

(Continued)

FOREIGN PATENT DOCUMENTS

JP     11-278301 A    10/1999
JP     2001-246995 A    9/2001
(Continued)

OTHER PUBLICATIONS

International Search Report, issued in PCT/JP2019/008048, dated Mar. 26, 2019.

(Continued)

*Primary Examiner* — D Glenn Dayoan
*Assistant Examiner* — Dana D Ivey
(74) *Attorney, Agent, or Firm* — Birch, Stewart, Kolasch & Birch, LLP

(57) ABSTRACT

This composite structure is characterized in that: an internally inserted component, which is molded from a resin material having a tensile elongation of 10% or more, is placed inside a metal member having a hollow closed cross-section such that an external load can be received by both the internally inserted component and the metal member, and the outer shape of the internally inserted component occupies 50% or more relative to the hollow closed cross-section of the metal member as projection area ratio. By disposing the resin-made internally inserted component having a specific toughness at a specified state inside the metal (Continued)

member having a hollow closed cross-section, especially when a collision load occurs, the metal member undergoes ductile deformation and the internally inserted component also deforms correspondingly, and thus the waveform of the load-displacement curve can approach an ideal rectangular waveform, and excellent impact energy absorbing performance can be exhibited.

5 Claims, 8 Drawing Sheets

(51) Int. Cl.
*B60R 19/18* (2006.01)
*F16F 7/12* (2006.01)

(52) U.S. Cl.
CPC ............ *B60R 2019/1833* (2013.01); *B60R 2019/1846* (2013.01); *B62D 29/004* (2013.01); *B62D 29/008* (2013.01); *F16F 7/12* (2013.01); *F16F 2228/007* (2013.01)

(58) Field of Classification Search
CPC ............ B60R 2019/1846; B60R 19/18; F16F 2228/007; F16F 7/12
USPC .................................................. 296/187.03
See application file for complete search history.

(56) References Cited

U.S. PATENT DOCUMENTS 9,782,950 B2 * 10/2017 Richardson ............ B32B 15/08
2013/0306419 A1 11/2013 Okuda

FOREIGN PATENT DOCUMENTS

| JP | 2005-170082 A | 6/2005 |
| JP | 2007-237944 A | 9/2007 |
| JP | 2010-195352 A | 9/2010 |
| JP | 2012-132552 A | 7/2012 |
| JP | 2016-27969 A | 2/2016 |
| JP | 2017-19428 A | 1/2017 |

OTHER PUBLICATIONS

Written Opinion of the International Searching Authority, issued in PCT/JP2019/008048, dated Mar. 26, 2019.

* cited by examiner

Hollow cross-sectional area of metal member: S

Projection area ratio: S1/S

Compression test of composite structure
(Examples 1-4, 6, Comparative Examples 1-3)

Compression test of composite structure (Example 5)

Drop weight impact test of composite structure
(Examples 7, 8, Comparative Example 4)

Bending test of composite structure (Example 9, Comparative Example 5)

COMPOSITE STRUCTURE

TECHNICAL FIELD OF THE INVENTION

The present invention relates to a composite structure, and specifically, to a composite structure suitable as a structure for a vehicle in which a resin-made internally inserted component is placed inside a metal member having a hollow closed cross-section.

BACKGROUND ART OF THE INVENTION

In a vehicle body frame structure of an automobile or the like, it is known to increase strength and rigidity of a frame and improve impact energy absorption by increasing the plate thickness of the frame or by disposing a reinforcing plate member (reinforcement) in the frame cross section for the purpose of enhancing the safety at the time of collision.

On the other hand, from the viewpoint of improving fuel efficiency and steering response, further weight reduction is desired, and in the conventional frame structure as described above, a considerable weight increase is caused, and therefore, it is difficult to achieve both improvement and maintenance of fuel efficiency and improvement of safety against collision at the same time.

Accordingly, as a structure that can cope with such inconvenience, it is proposed to place a lightweight resin reinforcing member in the frame cross section.

For example, in Patent document 1 relating to a vehicle impact energy absorbing structure, in particular, disclosed is a vehicle impact energy absorbing structure wherein a resin-molded impact absorbing member is contained inside a hollow closed cross-section of a center pillar or the like.

Further, in Patent document 2, disclosed is a skeleton structure of a vehicle wherein a reinforcing member is placed inside a skeleton member of the vehicle.

Further, in Patent document 3, it is disclosed to provide a reinforcing cylindrical body, an axis of which is extended in a direction applied with a bending load, in a beam member made of a light metal material and having a hollow closed cross-section.

Furthermore, in Patent document 4, it is disclosed to improve a frame energy absorbing performance more effectively by filling a filler material having specific material properties in the cross section of the frame.

In these conventional technologies, however, although the withstand load value at the time of collision is greatly improved, there are still problems in impact energy absorbing performance.

PRIOR ART DOCUMENTS

Patent Documents

Patent document 1: JP-A-2017-19428
Patent document 2: JP-A-2010-195352
Patent document 3: JP-A-2007-237944
Patent document 4: JP-A-HEI-11-278301

SUMMARY OF THE INVENTION

Problems to be Solved by the Invention

Accordingly, paying attention to the problems in the above-described conventional technologies, an object of the present invention is to provide a composite structure in which, in particular, a metal member is reinforced with a lightweight resin material, and a waveform of a load-displacement curve, when an external load such as a collision load is applied, can be approached to an ideal rectangular waveform.

Means for Solving the Problems

To achieve the above-described object, a composite structure according to the present invention is characterized in that an internally inserted component, which is molded from a resin material having a tensile elongation of 10% or more, is placed inside a metal member having a hollow closed cross-section such that an external load can be received by both the internally inserted component and the metal member, and an outer shape of the internally inserted component occupies 50% or more relative to the hollow closed cross-section of the metal member as projection area ratio.

In such a composite structure according to the present invention, by the above-described structure wherein the internally inserted component molded from a specific resin material having a tensile elongation of 10% or more is placed inside the metal member having a hollow closed cross-section, and the outer shape of the internally inserted component occupies 50% or more (that is, half or more) relative to the hollow closed cross-section of the metal member as projection area ratio, when the composite structure is deformed by an external load, for example, an impact load, the resin-made internally inserted component is also deformed following the deformation of the metal member, and both the metal member and the resin-made internally inserted component receive the external load cooperatively. At that time, the metal member is deformed at a ductile condition, but the internally inserted component molded from a resin material having a tensile elongation of 10% or more is deformed with a high toughness, and it becomes possible to approach the waveform of the load-displacement curve of the composite structure to an ideal rectangular waveform, and it becomes possible to realize an excellent impact energy absorbing performance.

In the above-described composite structure according to the present invention, it is preferred that the tensile strength of the resin material molded into the internally inserted component is 30 MPa or more. A high level of balance between the tensile strength and the tensile elongation allows the internally inserted component to have a higher strength, and also allows the composite structure to undertake a higher load.

Further, in the above-described composite structure according to the present invention, it is preferred that the internally inserted component has a molded surface extending in a direction intersecting with an external load direction. By having such a molded surface, it becomes possible to more efficiently receive the external load transmitted through the metal member. Although the direction intersecting with the external load direction is not particularly limited, from the viewpoint of more efficiently receiving the external load by the internally inserted component, preferably it is a direction perpendicular to the external load direction or a direction close to it.

Further, in the above-described composite structure according to the present invention, it is preferred that the internally inserted component has a rib formed to be latticed with respect to a direction facing an external load. Since the rib formed to be latticed can exert a high resistance against the external load, by having such a rib in the internally inserted component, it is possible to exhibit a high strength as the internally inserted component itself, and ultimately, as the composite structure.

Furthermore, in the above-described composite structure according to the present invention, it is preferred that the outer shape of the internally inserted component occupies 80% or more relative to the hollow closed cross-section of the metal member as projection area ratio. More preferably, it is a form occupying 90% or more. The higher the rate as the projection area ratio of the outer shape of the internally inserted component occupied relative to the hollow closed cross-section of the metal member, the faster the inner surface of the metal member, which starts to be deformed by the external load, can contact the internally inserted component, and a target property against an external load due to the cooperation of the metal member and the internally inserted component, that is, the property that the waveform of the load-displacement curve approaches the ideal rectangular waveform can be exhibited more reliably.

Such a composite structure according to the present invention is particularly useful when applied to a structure requiring excellent impact energy absorbing performance, especially a vehicle structure.

Effect According to the Invention

Thus, according to the composite structure of the present invention, by disposing the resin-made internally inserted component having a specific toughness at a specified state inside the metal member having the hollow closed cross-section, especially when a collision load occurs, the metal member undergoes ductile deformation and the internally inserted component also deforms correspondingly, and thus the waveform of the load-displacement curve can be approached to an ideal rectangular waveform, and excellent impact energy absorbing performance can be exhibited. In particular, the composite structure according to the present invention is extremely useful when applied to a vehicle structure.

EMBODIMENTS FOR CARRYING OUT THE INVENTION

Hereinafter, embodiments of the present invention will be explained in detail referring to figures.

Figure 1:
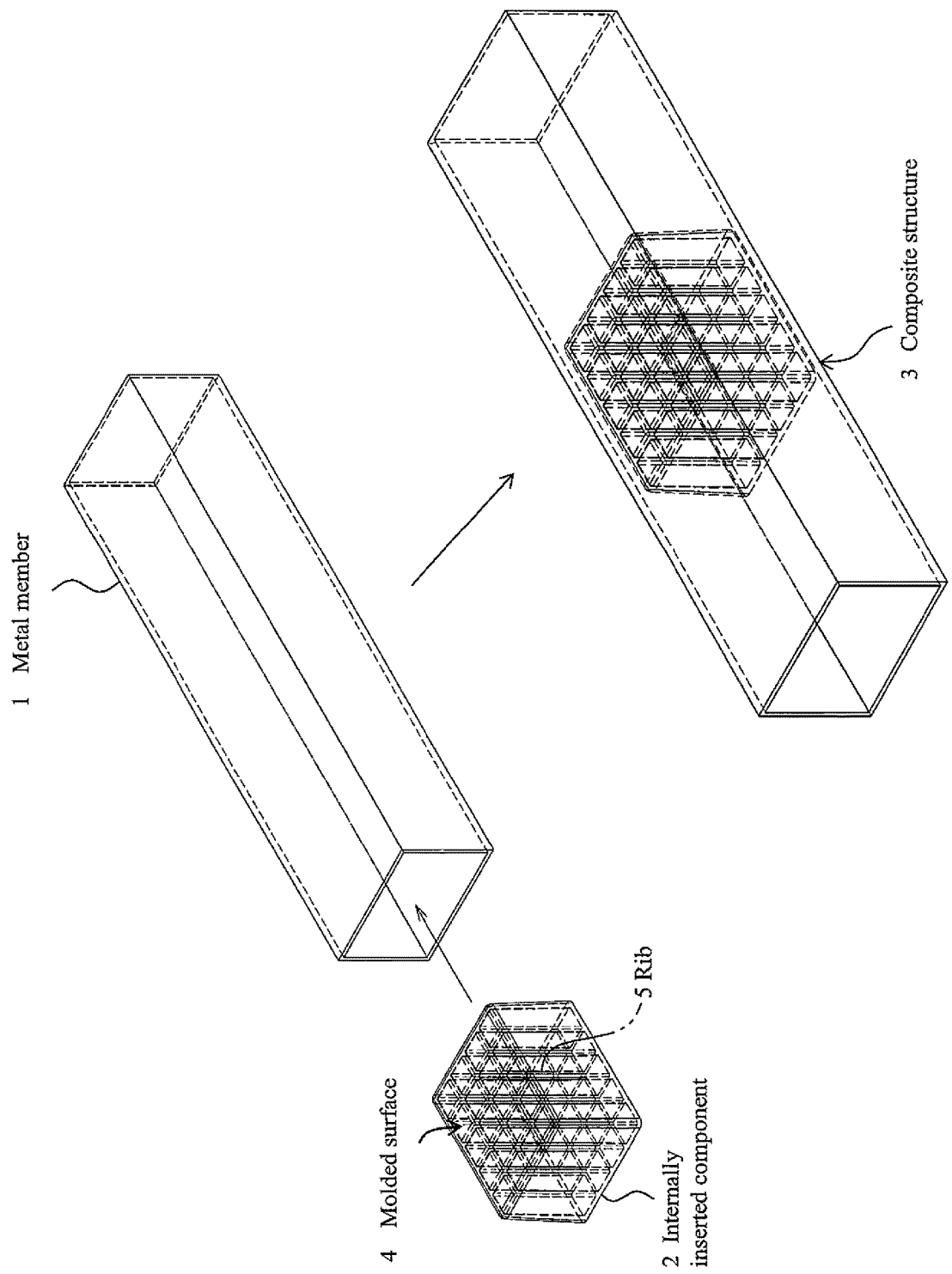
FIG. 1 is a perspective view showing a configuration of a composite structure according to an embodiment of the present invention.

In the composite structure according to the present invention, for example, as shown in FIG. 1 showing the configuration of a composite structure according to an embodiment of the present invention, an internally inserted component 2, which is molded from a resin material having a tensile elongation of 10% or more, is placed inside a metal member 1 having a hollow closed cross-section such that an external load can be received by both the internally inserted component 2 and the metal member 1, and such that an outer shape of the internally inserted component 2 occupies 50% or more relative to the hollow closed cross-section of the metal member 1 as projection area ratio, to form a composite structure 3.

In the present invention, the metal member is a member having a hollow closed cross-section, and as a typical example, a shape material made of a metal material having a hollow closed cross-section can be exemplified. As the metal material of the metal member, aluminum alloy, steel, titanium alloy, magnesium alloy, copper alloy, nickel alloy, cobalt alloy, zirconium alloy, zinc, lead, tin and alloys thereof can be preferably exemplified. In particular, in case where the composite structure according to the present invention is used as a vehicle structure, it is preferred that the metal member is made of a lightweight and relatively inexpensive material such as an aluminum alloy.

Further, in the present invention, the hollow closed cross-section structure is not particularly limited as long as an internally inserted component can be placed inside the hollow part. For example, as the shape of the closed cross section, a rectangular cross section (square, rectangle, trapezoid, rhombus), a circular cross section, an elliptical cross section, or a polygon other than quadrangle (triangle, pentagon, hexagon) can be preferably exemplified. Further, as the configuration of the closed cross section, in addition to a configuration formed from a single closed cross section (cell), a configuration formed from a plurality of closed cross sections (cells) can be preferably exemplified.

In the present invention, the internally inserted component is molded from a resin material having a tensile elongation of 10% or more, and the resin material used in the present invention is not particularly limited as long as it is a resin that can be molded by heating and melting.

By using the resin materials as described above for the internally inserted component of the present invention, it is possible to exhibit properties of weight reduction, high load, and rectangular waveform energy absorption (rectangular waveform load-displacement curve). As the resin materials, for example, polyamide resin, polyester resin, polyphenylene sulfide resin, polyphenylene oxide resin, polycarbonate resin, polylactic acid resin, polyacetal resin, polysulfone resin, tetrafluoride polyethylene resin, polyetherimide resin, polyamideimide resin, polyimide resin, polyethersulfone resin, polyetherketone resin, polythioetherketone resin, polyetheretherketone resin, polyethylene resin, polypropylene resin, styrene-based resins such as polystyrene resin and acrylonitrile/butadiene/styrene copolymer (ABS resin), polyalkylene oxide resin, and the like, can be preferably exemplified. Further, these two or more kinds may be mixed and alloyed (formed as a mixture) as long as the properties are not damaged.

Among the above-described resin materials, polyamide resin, polyester resin, polyphenylene sulfide resin, polyphenylene oxide resin, polycarbonate resin, ABS resin and polypropylene resin are preferably used. Polyamide resin, polyester resin, polyphenylene sulfide resin and polycarbonate resin are more preferable because they are excellent in strength and elongation, particularly in balance of tensile strength and tensile elongation.

The resin material used for the internally inserted component of the present invention has a tensile elongation of 10% or more, preferably 30% or more. If the tensile elongation is less than 10%, the internally inserted component placed inside the hollow closed cross-section cannot follow the ductile deformation of the metal member, and brittlely breaks, and therefore, it becomes impossible to absorb energy at a condition of a desirable rectangular waveform.

The internally inserted component of the present invention is produced by molding a resin material. As a molding method, a molding method using a mold is preferred, and various molding methods such as injection molding, extrusion molding, and press molding can be used. Particularly, by a molding method using an injection molding machine, a stable molded product can be continuously obtained. Although the conditions for injection molding are not particularly limited, for example, conditions of injection time: 0.5 second to 10 seconds, back pressure: 0.1 MPa to 10 MPa, holding pressure: 1 MPa to 50 MPa, holding pressure time: 1 second to 20 seconds, cylinder temperature: 200° C. to 340° C., and mold temperature: 20° C. to 150° C. are preferred. Here, the cylinder temperature indicates a temperature of a portion of the injection molding machine that heats and melts the molding material, and the mold temperature indicates a temperature of the mold that injects the resin for forming a predetermined shape. By appropriately selecting these conditions, particularly injection time, injection pressure (back pressure and holding pressure), and mold temperature, it is possible to appropriately adjust the appearance, sink, warpage, etc. of the internally inserted component.

In the present invention, the insertion direction of the internally inserted component is not particularly limited as long as it can be placed inside the hollow closed cross-section structure of a shape material as the metal member, but it is preferred that the internally inserted component has a molded surface extending in a direction intersecting an external load direction (for example, impact load direction). In the example shown in FIG. 1, the upper surface of the internally inserted component 2 is formed as a molded surface 4. As aforementioned, by having the molded surface extending in such a direction, it becomes possible to more efficiently receive the external load transmitted through the metal member via the molded surface. Namely, the load value that can be received such as a collision load increases. The direction intersecting with the external load direction is preferably a direction perpendicular to the external load direction or a direction close thereto, from the viewpoint of more efficiently receiving the external load by the internally inserted component.

Further, it is preferred that the internally inserted component in the present invention has a rib formed to be latticed with respect to the external load direction (for example, the impact load direction). For example, it is preferred that latticed ribs are formed subsequent to the above-described molded surface. In the example shown in FIG. 1, open-structure latticed ribs 5 extending downward are formed at the lower side of the upper surface as the molded surface 4. Since the ribs formed to be latticed can exert a high resistance against the external load, by having such ribs in the internally inserted component, it becomes possible to exhibit a high strength as the internally inserted component itself, ultimately, as the composite structure. Further, by having ribs formed to be latticed, it becomes possible to bring the load-displacement curve of the rectangular waveform closer to a more desirable rectangular waveform.

Figure 2:
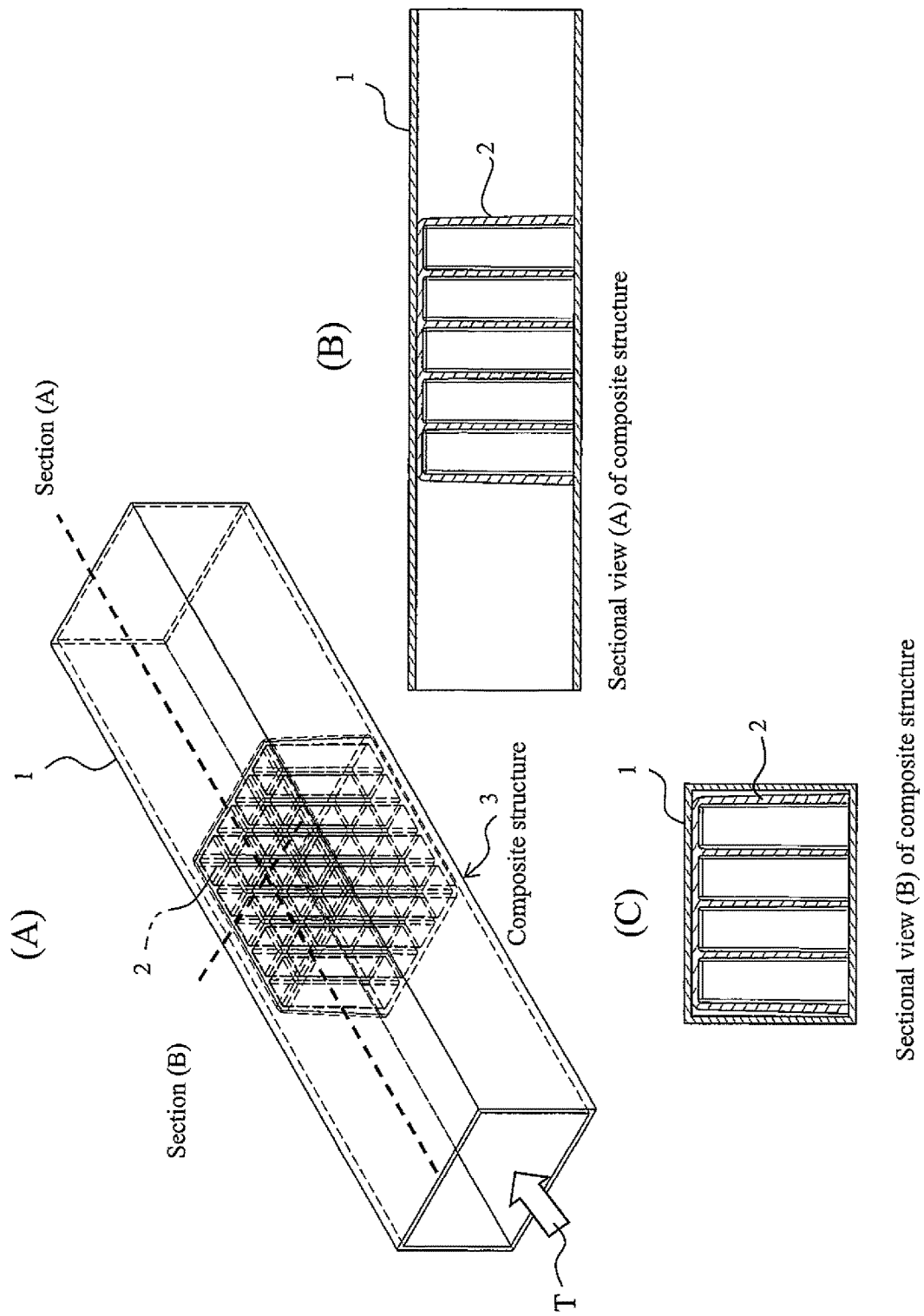
FIG. 2(A) is a perspective view of the composite structure shown in FIG. 1.
FIG. 2(B) is a cross-sectional view as viewed along the cross-section (A) of FIG. 2(A)
FIG. 2(C) is a cross-sectional view as viewed along the cross-section (B) of FIG. 2(A).
Figure 3:
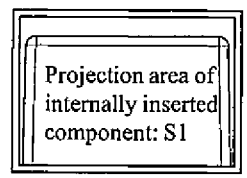
FIG. 3 is a side view of a composite structure according to an embodiment of the present invention, when viewed from the T direction in FIG. 2(A), which shows an example of a rate occupied by an outer shape of an internally inserted component relative to a hollow closed cross-section of a metal member as projection area ratio.

In the present invention, the insertion state of the internally inserted component is not particularly limited as long as it can be placed inside the hollow closed cross-section structure of the shape material. For example, as shown in FIG. 3 with an example of a rate occupied by an outer shape of an internally inserted component relative to a hollow closed cross-section of a metal member as projection area ratio when viewed from the T direction in FIG. 2(A), when the hollow cross-sectional area of the metal member in the projection direction is referred to be S and the projection area of the internally inserted component is referred to be S1, the internally inserted component is inserted and placed so that the projection area ratio of S1/S×100(%) is 50% or more. The projection area ratio is preferably 80% or more, and particularly preferably 90% or more. In the condition where the projection area ratio is 50% or more, when the composite structure is deformed by an external load, the possibility that the inner surface of the metal member can be in close contact with the outer surface of the internally inserted component is increased, a part of the external load is transmitted to the internally inserted component through the metal member, and it becomes possible to exhibit a desired performance, in particular, a performance of a load-displacement curve approaching a rectangular waveform. In particular, if the projection area ratio is 80% or more, or further 90% or more, because the inner surface of the metal member can be brought into a close contact with the outer surface of the internally inserted component more quickly, the waveform of the load-displacement curve when applied with an external load such as a collision load approaches a more desirable rectangular waveform, and the load value also becomes high, and such a condition is preferable.

In the present invention, a vehicle structure is preferably a long component (a member having a larger dimension in the longitudinal direction than the cross-sectional dimension), and a component receiving an impact load input from the lateral direction (direction having an angle with the longitudinal direction), and since the component has a function that absorbs the applied impact energy by the component itself or that transmits the applied impact load from the component to another structural component accompanying with a temporal change, as the component, for example, a member, which is provided together with a bumper beam or a side sill of an automobile, is preferably exemplified.

EXAMPLES

Hereinafter, the present invention will be explained in more detail with reference to examples, but the present invention is not limited to the description of these examples. First, materials used in these examples and evaluation methods for various properties will be explained.

(1) Shape Material as a Metal Member

Aluminum alloy square pipe: Outer shape: height 50 mm×width 70 mm×length 300 mm and length 1,000 mm, wall thickness: 2 mm, material: A6063-T5

(2) Resin Material

PC/PBT: Alloy material of polycarbonate resin and polybutylene terephthalate resin, grade name "8207X01B" (supplied by Toray Industries, Inc.)

PA: Polyamide resin, grade name "CM1017" (supplied by Toray Industries, Inc.)

PP: A mixture of polypropylene resin, ethylene-propylene copolymer and talc, grade name "LA880" (supplied by Prime Polymer Co., Ltd.)

PPS: Polyphenylene sulfide resin, grade name "A670X01" (supplied by Toray Industries, Inc.)

PA/GF: Glass fiber reinforced polyamide resin, grade name "CM1011G30" (supplied by Toray Industries, Inc.)

PA/CF: Carbon fiber reinforced polyamide resin, grade name "3101T30V" (supplied by Toray Industries, Inc.)

(3) Internally Inserted Component

The resin material was injection molded to produce the internally inserted component shown in FIG. 1.

(4) Evaluation of Tensile Strength and Tensile Elongation

Using an ISO test piece obtained by injection molding, based on ISO527-1 and 2 in an atmosphere of a temperature 23° C. and a humidity of 50%, the test piece was subjected to a tensile test at a strain rate of 50 mm/min for PC/PBT, PA, PP, and PPS materials, and at a strain rate of 5 mm/min for PA/GF and PA/CF materials to measure the tensile strength (strength) and the tensile elongation (breaking strain). Where, the polyamide resin-based material was subjected to the tensile test with a test piece in an atmospheric equilibrium water absorption state.

Figure 4:
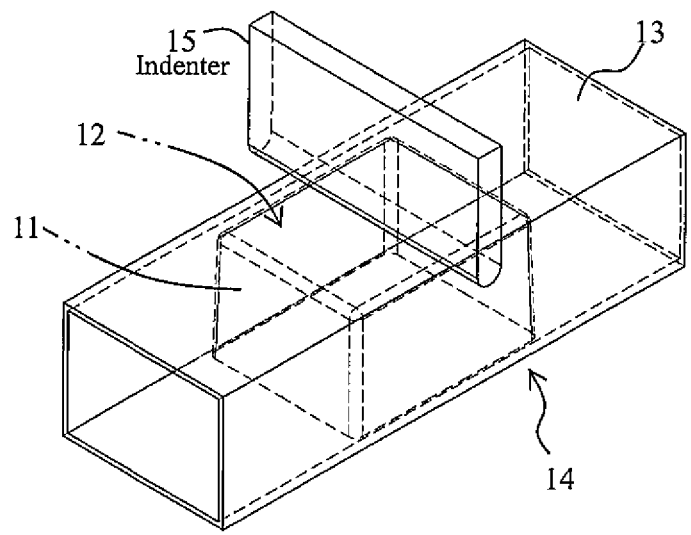
FIG. 4 is a perspective view showing an embodiment of a compression test of a composite structure according to an embodiment of the present invention.
Figure 5:
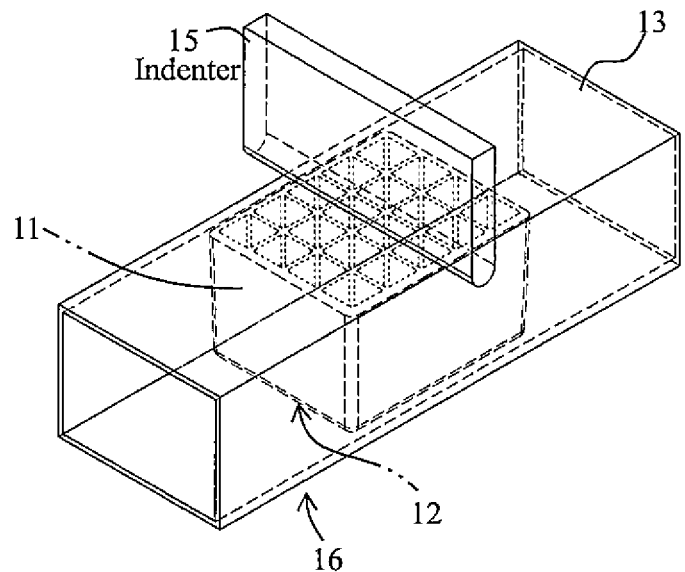
FIG. 5 is a perspective view showing an embodiment of a compression test of a composite structure according to another embodiment of the present invention.

(5) Evaluation of Compression Test (FIGS. 4, 5)

As shown in FIG. 4, a molded surface 12 of an internally inserted component 11 obtained by injection molding was set to be an upper surface (at an upper side), and the composite structure 14 inserted with the component 11 into an aluminum square pipe as a metal member 13 was used. A compression test was performed using an indenter 15 (roundness of the tip: R=5 mm) at a strain rate of 5 mm/min to measure the load and displacement (load-displacement curve). Further, as shown in FIG. 5, only in Example 5, the compression test was performed using a composite structure 16 in which the internally inserted component 11 was inserted at a condition turned upside down and the bottom surface side was set to be the molded surface 12. Where, the polyamide resin-based material was subjected to the tensile test with an internally inserted component in an atmospheric equilibrium water absorption state.

Figure 6:
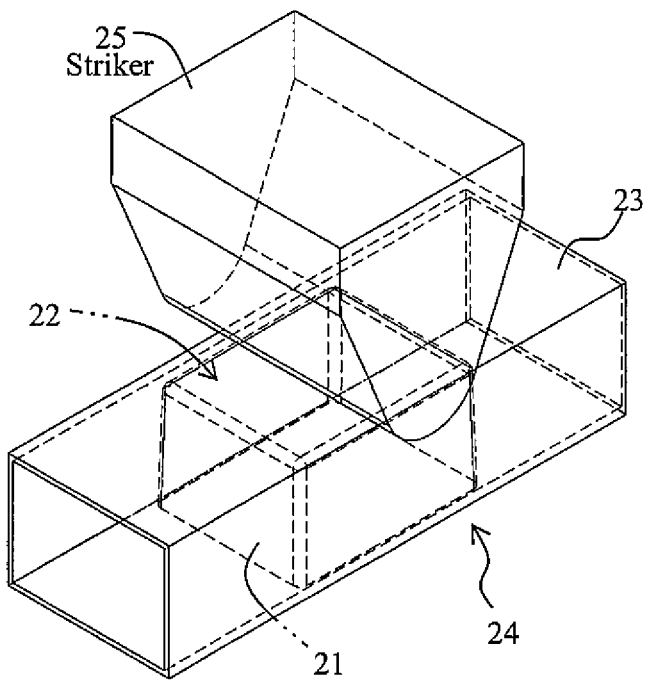
FIG. 6 is a perspective view showing an embodiment of a drop weight impact test of a composite structure according to an embodiment of the present invention.

(6) Evaluation of Drop Weight Impact Test (FIG. 6)

Using a composite structure 24 in which a molded surface 22 of an internally inserted component 21 obtained by injection molding was set to be an upper surface (at an upper side), and the composite structure 24 inserted with the component 21 into an aluminum square pipe as a metal member 23, a drop weight impact test was performed by a striker 25 (roundness of the tip end: R=20 mm) at conditions of a drop weight of 250 kg and a drop height of 1 m, to measure the load and displacement (load-displacement curve). Where, the polyamide resin-based material was subjected to the drop weight impact test with an internally inserted component in an atmospheric equilibrium water absorption state.

Figure 7:
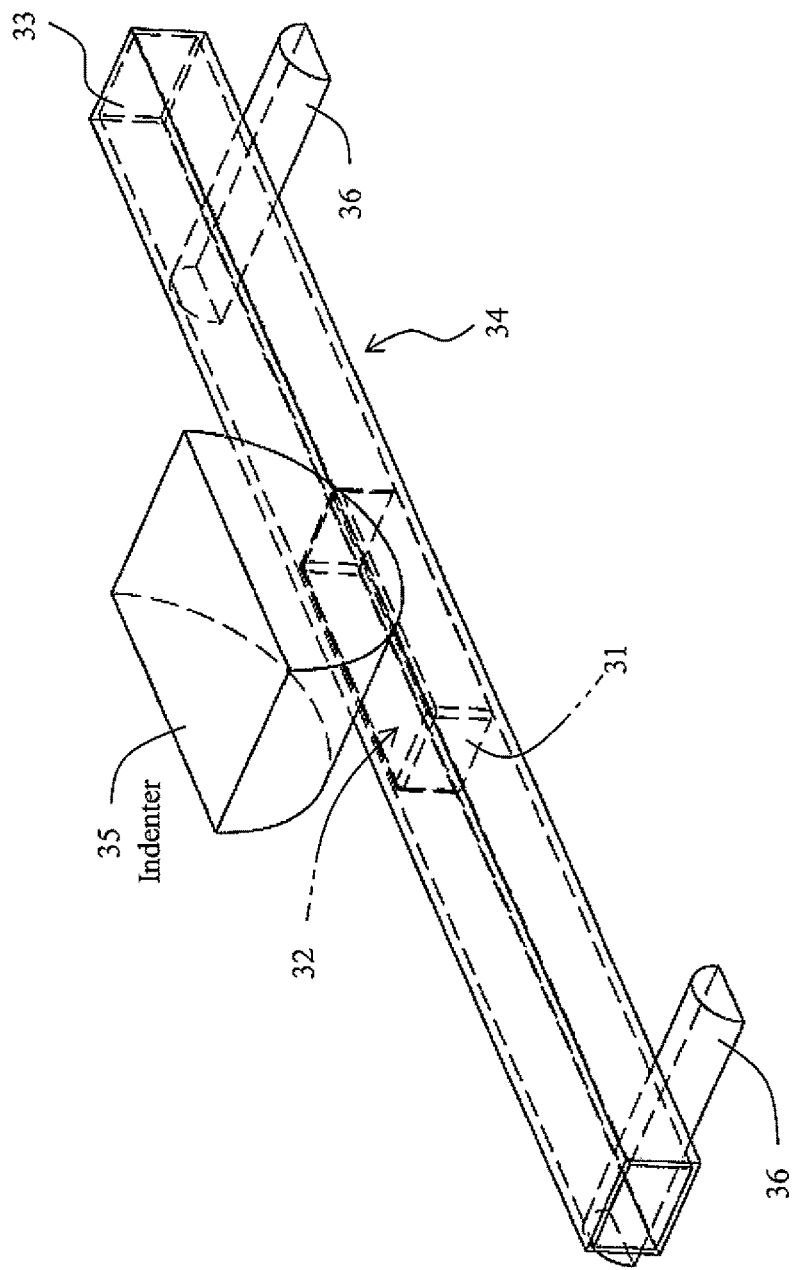
FIG. 7 is a perspective view showing an embodiment of a bending test of a composite structure according to an embodiment of the present invention.

(7) Evaluation of Bending Test (FIG. 7)

Using a composite structure 34 in which a molded surface 32 of an internally inserted component 31 obtained by injection molding was set to be an upper surface (at an upper side), and the composite structure 34 inserted with the component 31 into an aluminum square pipe as a metal member 33, a bending test was performed at conditions of an indenter 35 (roundness of the tip: R=127 mm), a fulcrum 36 (roundness of the tip: R=25 mm), the distance between two fulcrums of 800 mm, and a strain rate of 5 mm/min, to measure the load and displacement (load-displacement curve). Where, the polyamide resin-based material was subjected to the bending test with an internally inserted component in an atmospheric equilibrium water absorption state.

Reference Example 1

Figure 8:
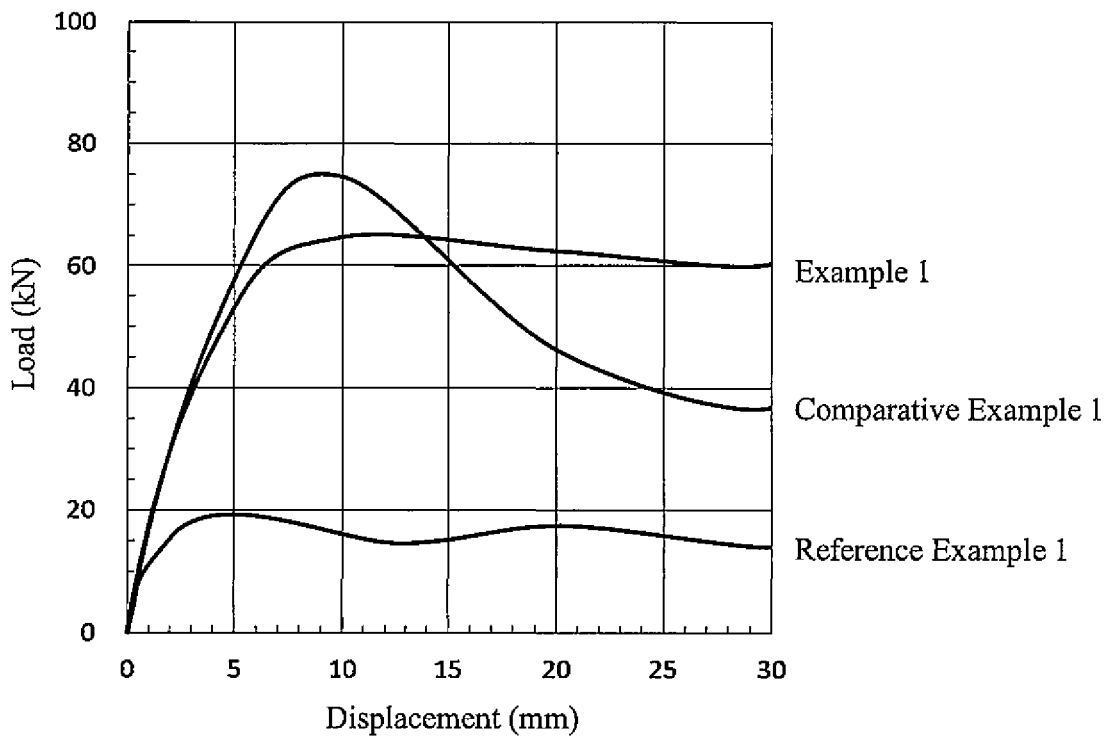
FIG. 8 is a graph showing a load-displacement curve of a composite structure according to an example of the present invention.

The evaluation result of the compression test of a single aluminum square pipe is shown in FIG. 8.

Example 1

The evaluation result of compression test performed at a condition where PC/PBT internally inserted component was inserted into an aluminum square pipe is shown in Table 1 and FIG. 8.

Comparative Example 1

The evaluation result of compression test performed at a condition where PA/GF internally inserted component was inserted into an aluminum square pipe is shown in Table 1 and FIG. 8.

Examples 2 to 4, Comparative Example 2

Figure 9:
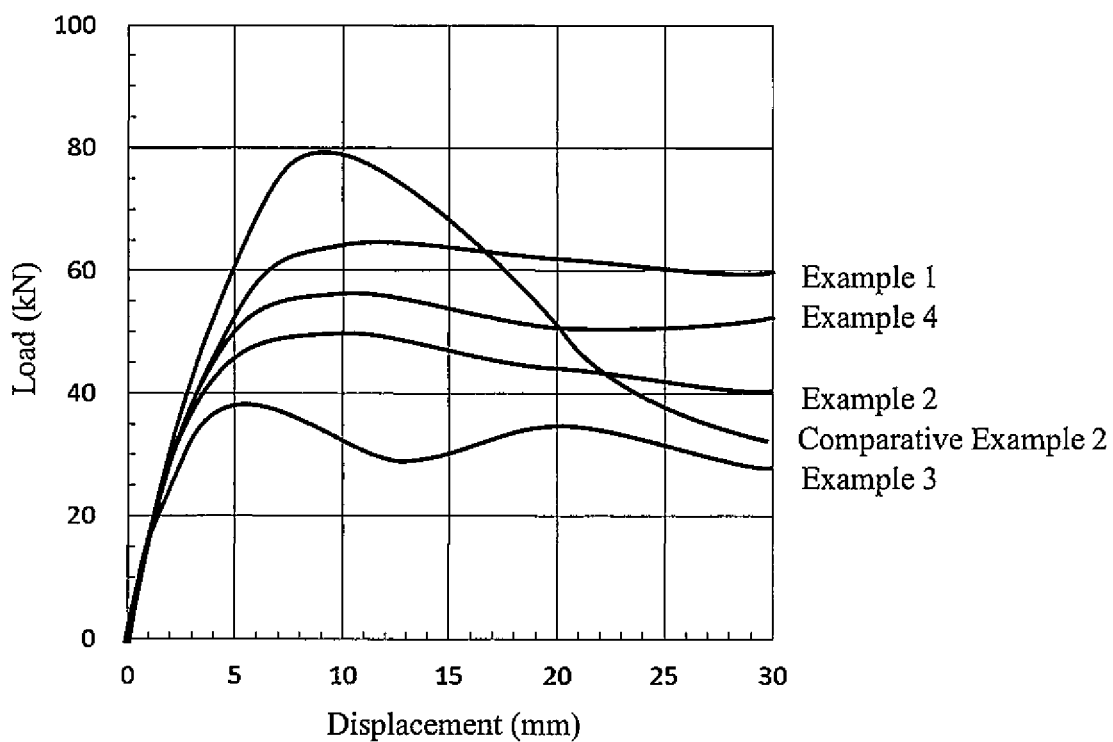
FIG. 9 is a graph showing a load-displacement curve of a composite structure according to another example of the present invention.

The evaluation results of compression tests performed at conditions where PA, PP, PPS, PA/CF internally inserted components were inserted into respective aluminum square pipes are shown in Table 1 and FIG. 9.

Example 5

Figure 10:
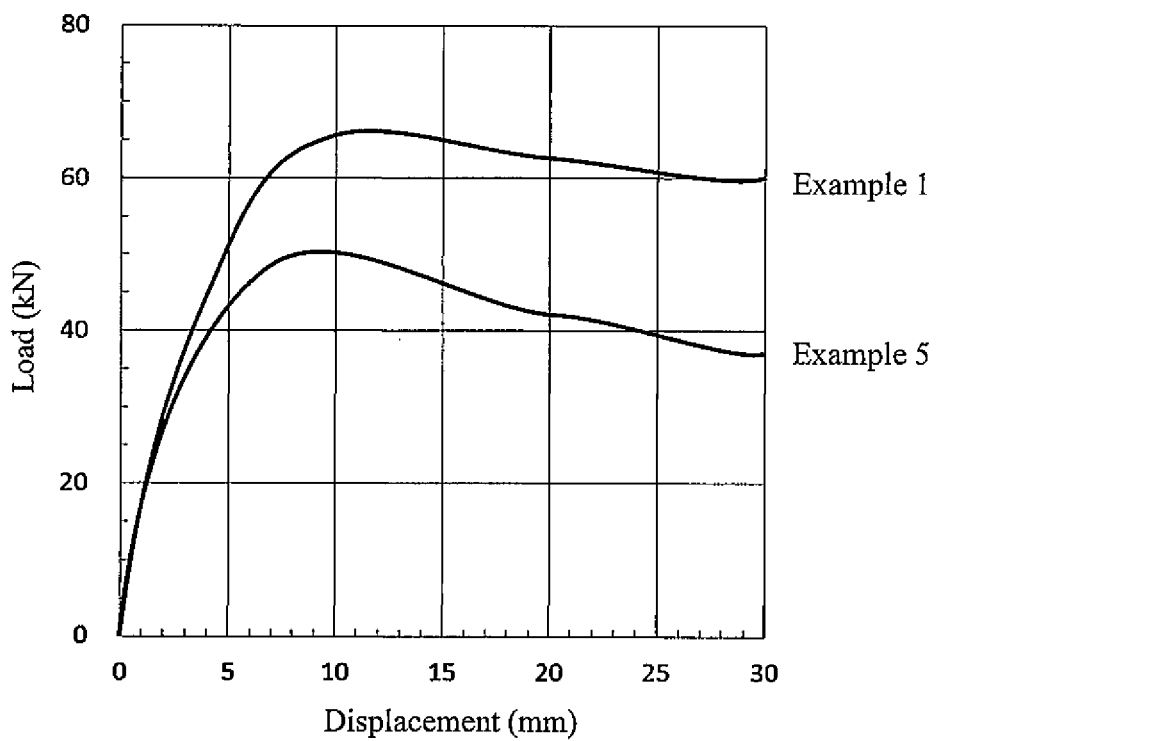
FIG. 10 is a graph showing a load-displacement curve of a composite structure according to a further example of the present invention.

The evaluation result of compression test, performed at a condition where PC/PBT internally inserted component in a state upside down with the molded surface set on the bottom surface side was inserted into an aluminum square pipe, is shown in Table 1 and FIG. 10.

Example 6, Comparative Example 3

Figure 11:
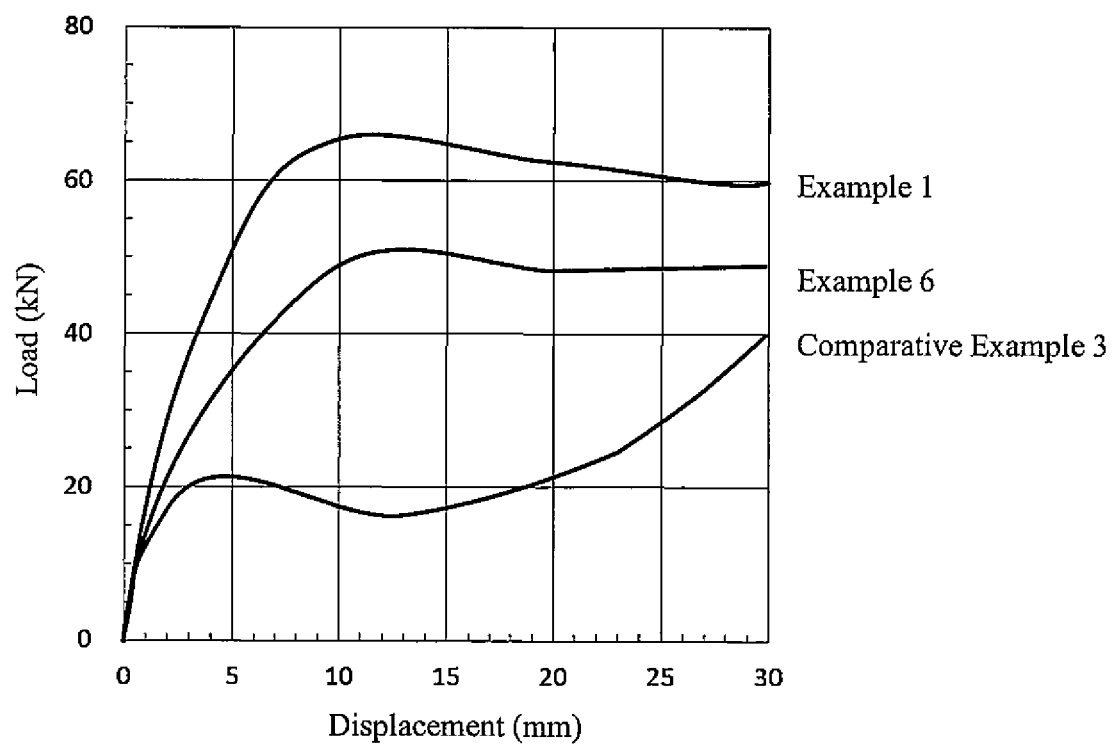
FIG. 11 is a graph showing a load-displacement curve of a composite structure according to a further example of the present invention.

The PC/PBT internally inserted components were cut to 80% in rib height (Example 6) and 40% in rib height (Comparative Example 3), respectively, and the components were inserted into respective aluminum square pipes to perform compression tests. The evaluation results are shown in Table 1 and FIG. 11.

Examples 7 and 8, Comparative Example 4

Figure 12:
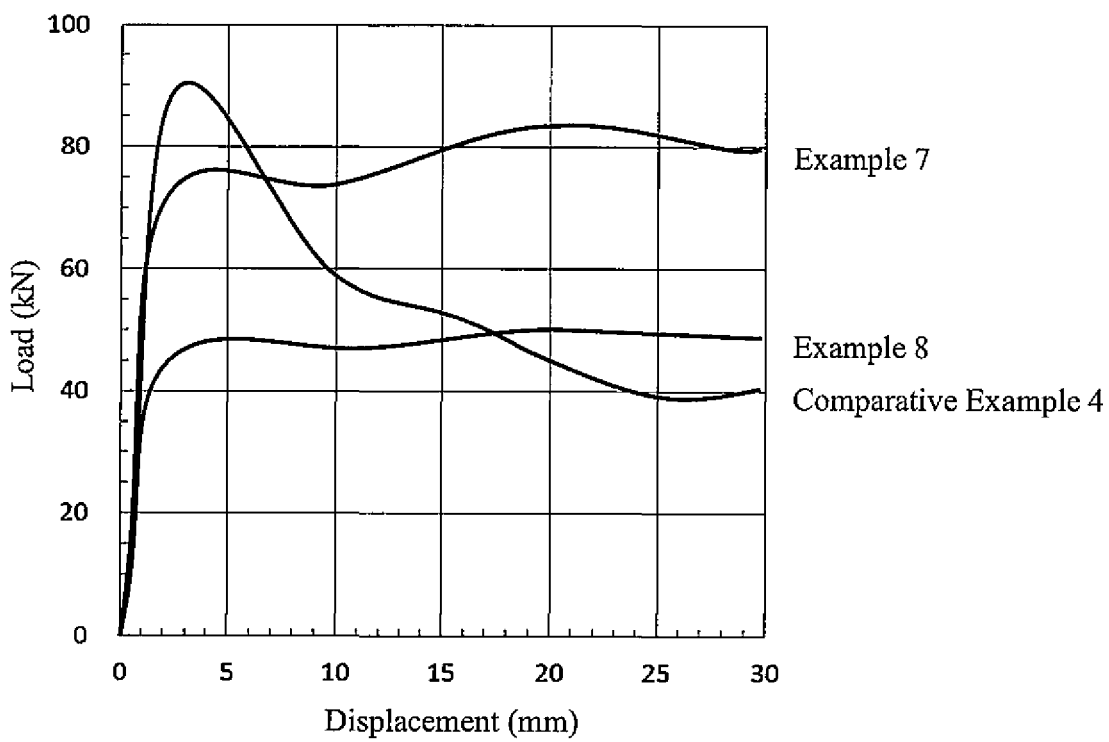
FIG. 12 is a graph showing a load-displacement curve of a composite structure according to a further example of the present invention.

The evaluation results of drop weight impact tests, performed at conditions where PC/PBT internally inserted component, PP internally inserted component and PA/GF internally inserted component were inserted into respective aluminum square pipes, are shown in Table 2 and FIG. 12.

Example 9, Comparative Example 5

Figure 13:
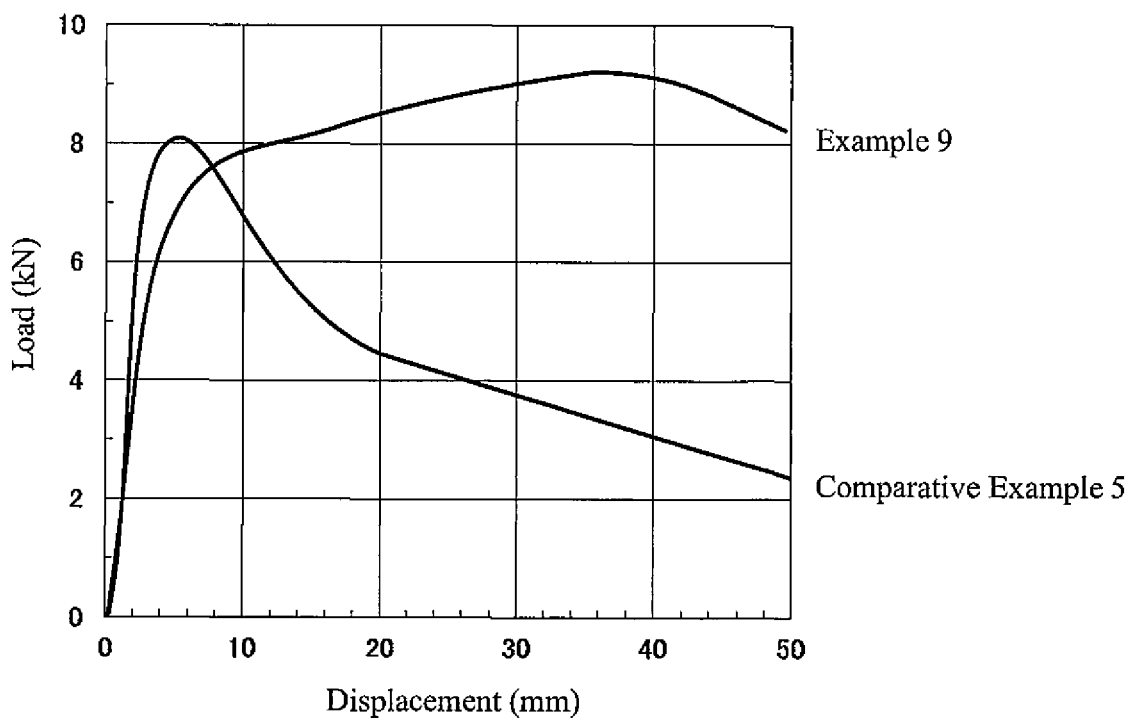
FIG. 13 is a graph showing a load-displacement curve of a composite structure according to a further example of the present invention.

The evaluation results of bending tests, performed at conditions where PC/PBT internally inserted component and PA/GF internally inserted component were inserted into respective aluminum square pipes, are shown in Table 3 and FIG. 13.

TABLE 1

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Resin-made internally inserted component | Material | PC/PBT | PA | PP | PPS | PC/PBT | PC/PBT | PA/GF | PA/CF | PC/PBT |
|  | Tensile properties Tensile strength (MPa) | 60 | 40 | 20 | 45 | 60 | 60 | 100 | 160 | 60 |
|  | Tensile elongation (%) | 50 | 50 | 50 | 25 | 50 | 50 | 5 | 2 | 50 |
|  | Molded surface of internally inserted component | Upper surface | Upper surface | Upper surface | Upper surface | Bottom surface | Upper surface | Upper surface | Upper surface | Upper surface |
|  | Projection area ratio (%) | <95 | <95 | <95 | <95 | <95 | 80 | <95 | <95 | 40 |
| Composite structure | Compression test Maximum load (kN) | 65 | 50 | 40 | 55 | 50 | 50 | 75 | 80 | 40 |
|  | Waveform | Rectangular | Rectangular | Rectangular | Rectangular | Rectangular | Rectangular | Falling to right | Falling to right | Rising to right |

TABLE 2

|  |  |  | Example 7 | Example 8 | Comparative Example 4 |
|---|---|---|---|---|---|
| Resin-made internally inserted component | Material |  | PC/PBT | PP | PA/GF |
|  | Tensile properties | Tensile strength (MPa) | 60 | 20 | 100 |
|  |  | Tensile breaking strain (%) | 50 | 50 | 5 |
|  | Molded surface of internally inserted component |  | Upper surface | Upper surface | Upper surface |
|  | Projection area ratio (%) |  | <95 | <95 | <95 |
| Composite structure | Drop weight impact test | Maximum load (kN) | 80 | 50 | 90 |
|  |  | Waveform | Rectangular | Rectangular | Falling to right |

TABLE 3

|  |  |  | Example 9 | Comparative Example 5 |
|---|---|---|---|---|
| Resin-made internally inserted component | Material |  | PC/PBT | PA/GF |
|  | Tensile properties | Tensile strength (MPa) | 60 | 100 |
|  |  | Tensile breaking strain (%) | 50 | 5 |
|  | Molded surface of internally inserted component |  | Upper surface | Upper surface |
|  | Projection area ratio (%) |  | <95 | <95 |
| Composite structure | Bending test | Maximum load (kN) | 9 | 8 |
|  |  | Waveform | Rectangular | Falling to right |

As shown in Table 1, Table 2 and Table 3, the composite structures according to the examples satisfying the features defined in the present invention have a good balance between the tensile strength and the tensile elongation of the resin-made internally inserted component, and as a composite structure, it was possible to achieve both a preferable high maximum load and a desirable load-displacement curve close to a rectangular waveform. However, in the composite structures according to the comparative examples which do not satisfy the features defined in the present invention, especially the load-displacement curve indicated an undesired property rising to the right or falling to the right.

INDUSTRIAL APPLICABILITY

The composite structure according to the present invention can be suitably applied to a vehicle structure because it can absorb energy at a rectangular waveform with a high load when an external load such as a collision load is applied.

EXPLANATION OF SYMBOLS 1, 13, 23, 33: metal member
2, 11, 21, 31: internally inserted component
3, 14, 16, 24, 34: composite structure
4, 12, 22, 32: molded surface
5: rib
15, 35: indenter
25: striker
36: fulcrum

The invention claimed is:

1. A composite structure comprising an internally inserted component that is inserted into a metal member having a hollow interior so as to enclose the internally inserted component in an enclosed circumferential direction, wherein the internally inserted component:
   is molded from a resin material having a tensile elongation of 10% or more,
   has a molded surface that is attached to an interior surface of the hollow interior of the metal member and that extends in a direction perpendicular to the enclosed circumferential direction,
   has ribs that are latticed and extend perpendicular to the molded surface,
   is disposed inside the hollow interior of the metal member such that an external load, that is applied to the metal member in an external load direction perpendicular to the enclosed circumferential direction, is received by both the internally inserted component and the metal member, and
   has an outer shape that occupies 50% or more as a projection area ratio relative to a cross-section of the hollow interior of the metal member along the enclosed circumferential direction.

2. The composite structure according to claim 1, wherein the resin material from which the internally inserted component is molded has a tensile strength of 30 MPa or more.

3. The composite structure according to claim 1, wherein the internally inserted component has an outer shape that occupies 80% or more as a projection area ratio relative to the cross-section of the hollow interior of the metal member along the enclosed circumferential direction.

4. The composite structure according to claim 1, which is incorporated into a vehicle structure.

5. The composite structure according to claim 1, wherein the resin material is an alloy material of polycarbonate resin and polybutylene terephthalate resin.

* * * * *